US008532637B2

(12) United States Patent
Abolrous et al.

(10) Patent No.: US 8,532,637 B2
(45) Date of Patent: Sep. 10, 2013

(54) SYSTEM AND METHOD FOR INTERACTIVE MESSAGING

(75) Inventors: Sally Abolrous, Bellevue, WA (US); Kim Ruosch, Bellevue, WA (US); Jay Jennings, Bellevue, WA (US); Emily Walker, Bellevue, WA (US); Jessica Yan, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 709 days.

(21) Appl. No.: 12/167,101

(22) Filed: Jul. 2, 2008

(65) Prior Publication Data

US 2010/0004008 A1   Jan. 7, 2010

(51) Int. Cl.
*H04L 29/08* (2006.01)
*H04M 1/725* (2006.01)
*H04W 4/00* (2009.01)

(52) U.S. Cl.
USPC ............... 455/414.4; 455/412.2; 455/466

(58) Field of Classification Search
USPC ............. 455/466, 412.1, 414.1, 414.2, 414.4, 455/412.2, 414.3
See application file for complete search history.

(56) References Cited

U.S. PATENT DOCUMENTS

| 5,022,070 | A | * | 6/1991 | Forson et al. | 379/32.01 |
|---|---|---|---|---|---|
| 5,771,459 | A | * | 6/1998 | Demery et al. | 455/517 |
| 5,872,926 | A | * | 2/1999 | Levac et al. | 709/206 |
| 6,259,781 | B1 | * | 7/2001 | Crouch et al. | 379/207.02 |
| 6,311,072 | B1 | * | 10/2001 | Barclay et al. | 455/552.1 |
| 6,643,709 | B1 | * | 11/2003 | Kwon | 709/246 |
| 7,103,154 | B1 | * | 9/2006 | Cannon et al. | 379/67.1 |
| 7,171,190 | B2 | * | 1/2007 | Ye et al. | 455/412.1 |
| 7,383,341 | B1 | * | 6/2008 | Saito et al. | 709/228 |
| 7,548,755 | B2 | * | 6/2009 | Kim | 455/466 |
| 8,145,257 | B2 | * | 3/2012 | Yim et al. | 455/550.1 |
| 2002/0196924 | A1 | * | 12/2002 | Dahari | 379/220.01 |
| 2003/0078033 | A1 | * | 4/2003 | Sauer et al. | 455/412 |
| 2003/0129969 | A1 | * | 7/2003 | Rucinski | 455/412 |
| 2004/0243674 | A1 | * | 12/2004 | Lu | 709/204 |
| 2004/0266411 | A1 | * | 12/2004 | Galicia et al. | 455/414.4 |
| 2005/0170855 | A1 | * | 8/2005 | Comer et al. | 455/466 |
| 2005/0255832 | A1 | * | 11/2005 | Turcanu | 455/412.1 |
| 2005/0261011 | A1 | * | 11/2005 | Scott | 455/466 |
| 2006/0099997 | A1 | * | 5/2006 | Ara | 455/566 |
| 2007/0140294 | A1 | * | 6/2007 | Takatori et al. | 370/466 |
| 2007/0173226 | A1 | * | 7/2007 | Cai et al. | 455/405 |
| 2007/0173268 | A1 | * | 7/2007 | Le Bodic et al. | 455/466 |
| 2007/0238474 | A1 | * | 10/2007 | Ballas et al. | 455/466 |
| 2007/0298842 | A1 | * | 12/2007 | Kamada et al. | 455/566 |
| 2008/0147819 | A1 | * | 6/2008 | Dettinger et al. | 709/206 |
| 2008/0160971 | A1 | * | 7/2008 | Jeon et al. | 455/414.1 |
| 2008/0161027 | A1 | * | 7/2008 | Benco et al. | 455/466 |
| 2008/0167035 | A1 | * | 7/2008 | Buckley et al. | 455/435.1 |

(Continued)

*Primary Examiner* — Christopher M Brandt
(74) *Attorney, Agent, or Firm* — Kenyon & Kenyon LLP

(57) ABSTRACT

A method and a system for providing convertible or interactive messaging between two or more users is provided. In an embodiment, a user sends a convertible message to another user. Such convertible messages can be sent using a communication means having two or more fields, ports, or the like. One of the fields, ports, or the like is used to identify the transmission as a convertible message. Another of the fields, ports, or the like is used to relay the text, icon, etc. of the message. Upon recognition of the convertible message, the receiving device allows for the display of the convertible message. The receiving user may manually accept to view the convertible message, and/or may view/not view the convertible message automatically upon receipt due to predefined rules.

32 Claims, 12 Drawing Sheets

(56) References Cited

U.S. PATENT DOCUMENTS

| | | | |
|---|---|---|---|
| 2008/0216022 A1* | 9/2008 | Lorch et al. | 715/847 |
| 2008/0242322 A1* | 10/2008 | Scott et al. | 455/466 |
| 2009/0061825 A1* | 3/2009 | Neelakantan et al. | 455/412.1 |
| 2009/0129372 A1* | 5/2009 | Pandey et al. | 370/352 |
| 2009/0131090 A1* | 5/2009 | Jo et al. | 455/466 |
| 2009/0168792 A1* | 7/2009 | Veits | 370/412 |
| 2009/0187398 A1* | 7/2009 | Wrobel | 704/8 |
| 2009/0197622 A1* | 8/2009 | Atarius | 455/466 |
| 2009/0215476 A1* | 8/2009 | Tysowski | 455/466 |
| 2009/0221307 A1* | 9/2009 | Wolak et al. | 455/466 |
| 2009/0239556 A1* | 9/2009 | Sennett et al. | 455/466 |
| 2010/0056118 A1* | 3/2010 | Galicia et al. | 455/414.4 |
| 2010/0159888 A1* | 6/2010 | Sigmund et al. | 455/413 |
| 2010/0298012 A1* | 11/2010 | Damarla | 455/466 |

* cited by examiner

| Type of Wave | Text string on MMS | Text string in Notification pop up | Text string on idle when Fave is center circle |
|---|---|---|---|
| Default | MSG-0145<br>Emily B.<br>👋 I'm waving Hello.<br>2:13 PM<br>Options Wave Back | MY5-0110<br>T-Mobile 5:22pm<br>Robert is Waving Hello<br>Wave back / Dismiss | MY5-0113<br>T-Mobile 5:22pm<br>Robert is waving Hello<br>Menu / OK / Ph.Book |
| Custom Wave text<br>My5-0132<br>Customize the Wave for Robert:<br>1. Create custom Wave<br>2. Change to a Kiss<br>3. Change to a hug<br>4. Change to a Wave<br>Select / Cancel | MSG-0145<br>Emily B.<br>👋 Goodbye<br>2:13 PM<br>Options Wave Back | MY5-0110<br>T-Mobile 5:22pm<br>Robert waves goodbye<br>Wave back / Dismiss | MY5-0113<br>T-Mobile 5:22pm<br>Robert waves goodbye<br>Menu / OK / Ph.Book |
| Kiss<br>My5-0132<br>Customize the Wave for Robert:<br>1. Create custom Wave<br>2. Change to a Kiss<br>3. Change to a hug<br>4. Change to a Wave<br>Select / Cancel | MSG-0145<br>Emily B.<br>👋 I'm sending a kiss<br>2:13 PM<br>Options Wave Back | MY5-0110<br>T-Mobile 5:22pm<br>Robert is sending a kiss<br>Wave back / Dismiss | MY5-0113<br>T-Mobile 5:22pm<br>Robert sent a kiss<br>Menu / OK / Ph.Book |
| Hug<br>My5-0132<br>Customize the Wave for Robert:<br>1. Create custom Wave<br>2. Change to a Kiss<br>3. Change to a hug<br>4. Change to a Wave<br>Select / Cancel | MSG-0145<br>Emily B.<br>👋 I'm sending a hug<br>2:13 PM<br>Options Wave Back | MY5-0110<br>T-Mobile 5:22pm<br>Robert is sending a hug<br>Wave back / Dismiss | MY5-0113<br>T-Mobile 5:22pm<br>Robert sent a hug<br>Menu / OK / Ph.Book |

FIG.9

SYSTEM AND METHOD FOR INTERACTIVE MESSAGING

COPYRIGHT AND LEGAL NOTICES

A portion of the disclosure of this patent document may contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

FIELD OF THE INVENTION

The present invention relates generally to a messaging in which a user sends a message of a specific type to another user, which is converted into an alternate messaging event upon receipt of the message by the receiving user. The present invention further relates to interactive or convertible messaging events between users of a predefined preferred group of contacts.

BACKGROUND

Mobile devices, such as wireless or cellular telephones, smart phones, portable computers, etc., are common communication tools in modern society. A wide variety of handset styles are available such as the "clam shell" flip-style mobile devices, the non-flip or "candy-bar" style mobile devices, and other mobile devices with pivoting displays. While the internal designs of the mobile devices may be quite different, each share common features: at least one display screen, vibration/sound ability, and SMS/MMS/Email/Internet and such messaging access.

Many modern mobile device devices also incorporate organizational tools. Such commonly available organizational tools include call lists and address books, calendars, personal reminders, task lists, and other information. The use of modern mobile devices has moved from the original system of connecting two persons via a voice line to data services, such as text messaging, multimedia messaging (e.g. sharing digital still and video files), taking digital photographs, listening to audio files, and accessing the Internet. Remote communication between persons has extended far past the basic voice line, and there continues to be a growing need for efficient, useful forms of communication and interactions with others.

SUMMARY OF THE INVENTION

Embodiments of the present invention provide a quick, playful, and non-intrusive interaction between a sending party and one or more receiving parties. In an embodiment, an interactive or convertible message is sent from a mobile device, a landline device, the Internet, or any other device capable of sending a convertible message, to one and/or more receiving devices. Upon receipt, the convertible message triggers a messaging event on the receiving device.

In an embodiment of the present invention, the interactive or convertible message may be sent to one or more receiving devices to privately communication or broadcast a message with or essentially with "one click."

In an embodiment of the present invention, a convertible message is provided as an option in the communication screen. For example, when a sending user wishes to contact a second person, the user via the sending device (from a mobile device, the Internet or other means) opens a contact file associated with that second person and clicks the appropriate communication icon (e.g., "Hello"). Upon receipt, the receiving user's (i.e., the second person's) device may vibrate and present a further messaging event, such as displaying a photo, an icon, an animation, and/or text line, or play an audio file, among other things. In an embodiment, the receiving person's device may show a "hello" text box when the user via the receiving device clicks on the message, clicks on the first person's contact icon, or another action. In an embodiment, the second person's device may be set to allow the alternate message "hello" screen or text to automatically appear when received, eliminating any need for the second person to do anything but view the message. In an embodiment, the sending person's photo or other image/text is shown in a pop-up notification. In an embodiment, the convertible message is compiled in a call log of the receiving device. In an embodiment, the convertible message is saved in the memory of the receiving device. In an embodiment, the convertible message is saved and/or synched with a corresponding server, server database, remote location, Internet site, and/or Internet account.

In an embodiment of the present invention, the convertible message style can be changed at least one of automatically, dynamically, remotely, manually, etc. That is, a sending user can change the convertible behavior and select a different text, photo, video, etc. to display to an intended recipient. The convertible messaging event may be customized or personalized to a specific intended recipient, or generally for all intended recipients. Different convertible messaging events can be preset for each contact or only some contacts in an address book. Or, a default convertible messaging event can be selected for all contacts in an address book, or for a specifiable subset of contacts in an address book. Such convertible messaging event customization can be effected automatically. For example, a specific text message of "good morning" can be set for all convertible messages being sent between 12:00 a.m. and 11:59 a.m., and a second text message of "good day" can be set for all convertible messages sent during the 12:00 p.m. to 11:59 p.m. time period. Thus, at 12 a.m., the convertible messaging event is automatically changed by the mobile device system (or carrier server, for example). Such convertible messaging event customization can be effected dynamically. A sending party can choose the customization at the time immediately preceding the transmission of the convertible message. For example, a drop-down screen will provide alternative convertible messaging events (e.g., sounds, videos, images, lights, and/or a text box) which can the sending party can use to create a new message. Upon the sending user's selection, the convertible message is then transmitted to the intended receiving device. Such convertible messaging event customization can be effected remotely. For example, a user can send a convertible message using the user's network account via a computer or other device having some type of network accessibility. Likewise, the customization of the convertible messaging event can be set remotely in the user's network account via a computer or other device having some type of network accessibility. Such convertible messaging event customization can also be effected manually, as explained herein.

In an embodiment of the present invention, convertible messages can be sent to contacts having different network providers.

An embodiment of the present invention provides a method for transmitting a convertible message to a receiving device is provided, including selecting at least one contact having an address; selecting the convertible message to transmit to a receiving device; transmitting the convertible message to the receiving device, wherein the selecting the convertible message initiates a population of: a) an address field in the convertible message with the address of the at least one contact, and b) a trigger field in the convertible message with a conversion trigger. In an embodiment, the conversion trigger is a character text string. In an embodiment, the selecting the convertible message includes: selecting a type of message; and selecting a message content. In an embodiment, the message content is one of: a pre-defined message and a customized message. In an embodiment, the pre-defined message is one of: a pre-selected message associated with a specific contact and a message selectable from a provided list of defined messages. In an embodiment, the message content applies to all contacts of the at least one contact, or to a specific contact of the at least one contact. In an embodiment, the message content is at least one of: text, an icon, an animated icon, an animation, an image, an animated image, audio, and a video. In an embodiment, the type of message is one of: a Short Message Service (SMS), a Multimedia Messaging Service (MMS), an Instant Message (IM), an electronic mail (E-mail), a transmission via Simple Mail Transfer Protocol (SMTP), a transmission via Post Office Protocol (POP), a transmission via Internet Message Access Protocol (IMAP), a transmission via IP Multimedia Subsystem running over Standard Internet Protocols (IMS-SIP), a transmission via User Diagram Protocol (UDP), and a transmission via Internet Protocol (IP). In an embodiment, the address is one of: an email address, International Mobile Subscriber Identity (IMSI) address, an Internet Message Format (IMF), a Medium Access Control (MAC) address, a telephone number, a network address, and a device identification number. In an embodiment, the at least one contact is associated with a stored contact file in an address book of the transmitting device and/or on a separate device, a server, a remote memory location, and a portable memory device. In an embodiment, the receiving device is at least one of telecommunications-capable and IP protocol-capable. In an embodiment, a transmitting device transmits the convertible message to the receiving device, the transmitting device being at least one of telecommunications-capable and IP protocol-capable.

An embodiment of the present invention provides a method for receiving a convertible message, including receiving a convertible message by a receiving device; identifying a conversion trigger in a trigger field in the received convertible message; associating the conversion trigger with at least one conversion rule in a database to provide a converted convertible message; and displaying the converted convertible message on the receiving device. In an embodiment, the database resides on at least one of: the receiving device, a server, and a network. In an embodiment, the displaying of the converted convertible message is a playing of an audio file.

An embodiment of the present invention provides a system for sending and receiving a convertible message, including a convertible message having an address and a conversion trigger, the convertible message prepared by a transmitting device; a conversion rule stored in a database, the conversion rule being associated with the conversion trigger; and a converted convertible message, such that when the convertible message is transmitted from a transmitting device to a receiving device, the receiving device converts the convertible message into a converted convertible message based on the associated conversion rule and displays the converted convertible message.

In an embodiment of the present invention, the convertible message includes a message content. In an embodiment, the conversion trigger is a character text string. In an embodiment of the present invention, the convertible message is one of: a Short Message Service (SMS), a Multimedia Messaging Service (MMS), an Instant Message (IM), an electronic mail (E-mail), a transmission via Simple Mail Transfer Protocol (SMTP), a transmission via Post Office Protocol (POP), a transmission via Internet Message Access Protocol (IMAP), a transmission via IP Multimedia Subsystem running over Standard Internet Protocols (IMS-SIP), a transmission via User Diagram Protocol (UDP), and a transmission via Internet Protocol (IP). In an embodiment, the converted convertible message includes at least one of: a text, an icon, an animated icon, an animation, an image, an animated image, audio, and a video. In an embodiment, the converted convertible message includes at least one of: an animated waving hand, an animated waving hand with an audio sound, a kiss icon, a kiss icon with an audio sound, a hug icon, a hug icon with an audio sound, an animated hug icon, and an animated hug icon with an audio sound. In an embodiment, each of the receiving device and the transmitting device is at least one of telecommunications-capable and IP protocol-capable.

BRIEF DESCRIPTION OF THE DRAWINGS

FIG. 9 shows an example user interaction sequence to customize types of a message according to an embodiment of the present invention.

DETAILED DESCRIPTION

Figure 1:
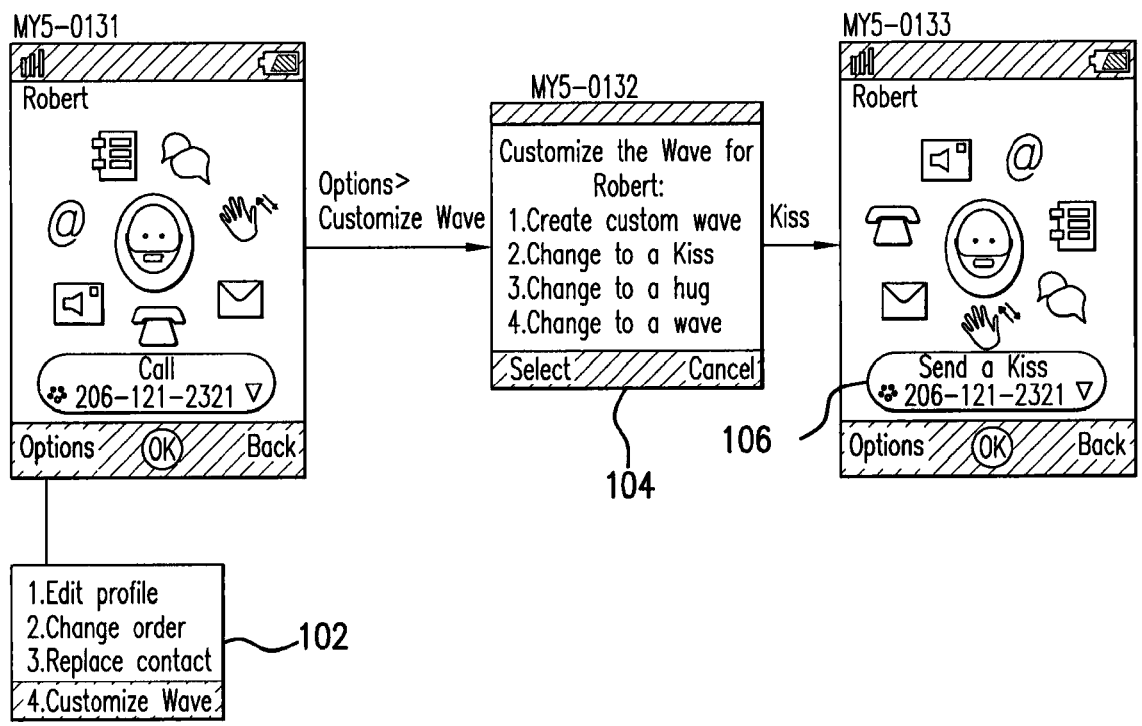
FIG. 1 shows an example customization of a convertible message according to an embodiment of the present invention.

In an embodiment, a user may send a convertible message or "one-click" message via any available messaging means having at least two fields. One field would be set to alert or trigger the user interface or other action of the receiving device that the received message is a convertible message or "one-click" message. The second or more fields or ports would include the message itself. As discussed herein, the message may be preset and/or personalized, and include one or more of text, icon, image, photo, video, sound, sound effect, voice recording, animation, etc. Further, the message could initiate a vibration or shaking of the receiving device. In an embodiment, use of preset messages can ease transmission involving multiple software platforms and/or networks.

For example, a user may send a message through any available messaging means, e.g., MMS, SMS, IM, email (via a variety of protocols, e.g., SMTP, POP, IMAP, IMF, IMS-SIP (session based), UDP, etc.) That is, while some of the figures describe an example convertible messaging system or method involving use of MMS, such is for example purposes. The convertible messaging system can use any of a variety of messaging methods, as determined by the user, receiver's network provider, sender's network provider, user's sending device, receiver's sending device, etc. For example, a convertible messaging system may use IMS-SIP, and establish a session between two users to allow for one-click messaging according to the various embodiments described herein. In an IMS, pings are sent between a sending device to a network to a receiving device regarding availability before the convertible message is transmitted. For example, a convertible messaging system may use SMS in which two or more ports can be used. One of the ports can contain the convertible message header container and the second port can be used to contain the content. In the content, the text can indicate how to direct and how things should be displayed on the receiving device. For example, a convertible messaging system may use Email or the like via an IP protocol, e.g. SMTP, POP (pull from client), IMF (pushes to client), etc. For example, a convertible messaging system may use SyncML (OMA) by, e.g., populating a vcard with an icon, text, etc. and provide that one field is the "hello" or trigger field to indicate that it is a convertible message.

Or, for example, a convertible messaging system may use MMS in which the application identification is sent along with a subject line. Alternatively, a convertible messaging system may use MMS to send along an application identification, application attribute field (e.g., how to use the data—e.g., if image then animate, etc.), and content. In an embodiment, a user sends an MMS (Multimedia Messaging Service) to another user. The MMS contains a subject line which is automatically filled when the user selects to send a convertible message. When a receiving user's device receives the MMS, the receiving device reads the subject line of the MMS (or field/port/pipe/communication line of the SMS, Email, or other messaging means as described above with respect to different embodiments of the present invention) and identifies the subject line contents as indicating the specific convertible messaging system. Upon recognition of the subject line contents, the receiving device allows for the display of the convertible message event. The receiving user may/may not manually accept to view the convertible message, or may view/not view the convertible message automatically upon receipt due to predefined rules. In a further embodiment, a sending user may select among a preferred contact group to whom to send a convertible message. A user interface may be provided from a sending user homepage to display an option for sending a convertible message. In an embodiment, the line text may be limited to a specific number of characters, e.g., 15 characters or less so as to best fit most mobile device screensizes.

In an embodiment, from a server's perspective, a variety of situations may occur. For example, if the communication is Internet initiated, then a url is used, and a "hello" or convertible message is web-pushed. Or, for example, if the communication is mobile device initiated, the receiving mobile device pulls the "hello" or convertible message from the server. Or, for example, if Bluetooth technology is used, then the "hello" or convertible message is sent from device to device. A number of different scenarios can be used with respect to embodiments of the present invention which allow for convertible messaging between a device and the Internet, a device and a server, a device and a second device, etc. In an embodiment, a barcode, a three-dimensional barcode, and/or matrix barcode may be used in conjunction with the other embodiments described herein. In this embodiment, a coupon or other item is obtained after pushing the barcode to get the link.

In an embodiment, use of a subset or selected contact group may facilitate quick and easy selection of a contact from among an array of the user's contacts (as designated by the user), followed by quick and easy application selection from a variety of communications modes, including single-click initiation of a communication mode of a default contact or a default communication mode. See, for example, U.S. patent application Ser. No. 11/400,925, filed on Apr. 10, 2006, entitled "Preferred Contact Group Centric Interface," the entirety of which is expressly incorporated herein in its entirety by reference thereto. In an example embodiment, a display of five contacts or, for example, myFaves® contacts, is presented on an idle screen of the user's communication device, with photo or image icons representing each of the contact. The user may initiate a communication mode for a pre-selected default contact with a single click, or may swiftly traverse through his or her contacts using navigation keys configured for such purpose (e.g., up/down/left/right keys) until the desired contact is highlighted, then may initiate a pre-selected default communication to the highlighted contact simply by pressing the designated default key on the communication device or may traverse through numerous other communications modes that are available to communicate with the selected contact (e.g., e-mail, instant messaging, photo messaging, SMS, MMS) simply by using navigation keys configured for such purpose (e.g., up/down/left/right keys) and then pressing a designated selection button on the communication device.

Although many of the example embodiments illustrated in the figures show a grouping of five contacts related to an interface, the exact number of contacts is represented here for exemplary purposes and may be any number of contacts (e.g., 1, 2, 7, 10, 20, 100, etc) which can be employed individually or as part of groups (e.g., "Study Group" identifying a group of one or more contacts). Further, herein, the term communication device is intended to cover a wide variety of devices such as, for example, mobile device type devices, PDA/PIM style devices, as well as other devices that include communication facilities. In another embodiment, the user's contacts can be a Web-enabled page that is downloaded from a network connection such as a Web page or a WAP page, possibly including active X, Java, Flash, or some other scripting or executable format that provides a uniform interaction on all similar communications devices. Contacts can be managed through the Web, or WAP, other over-the-air transport technology, a cable interface with the device or other connection to another device (e.g., personal computer).

Figure 10:
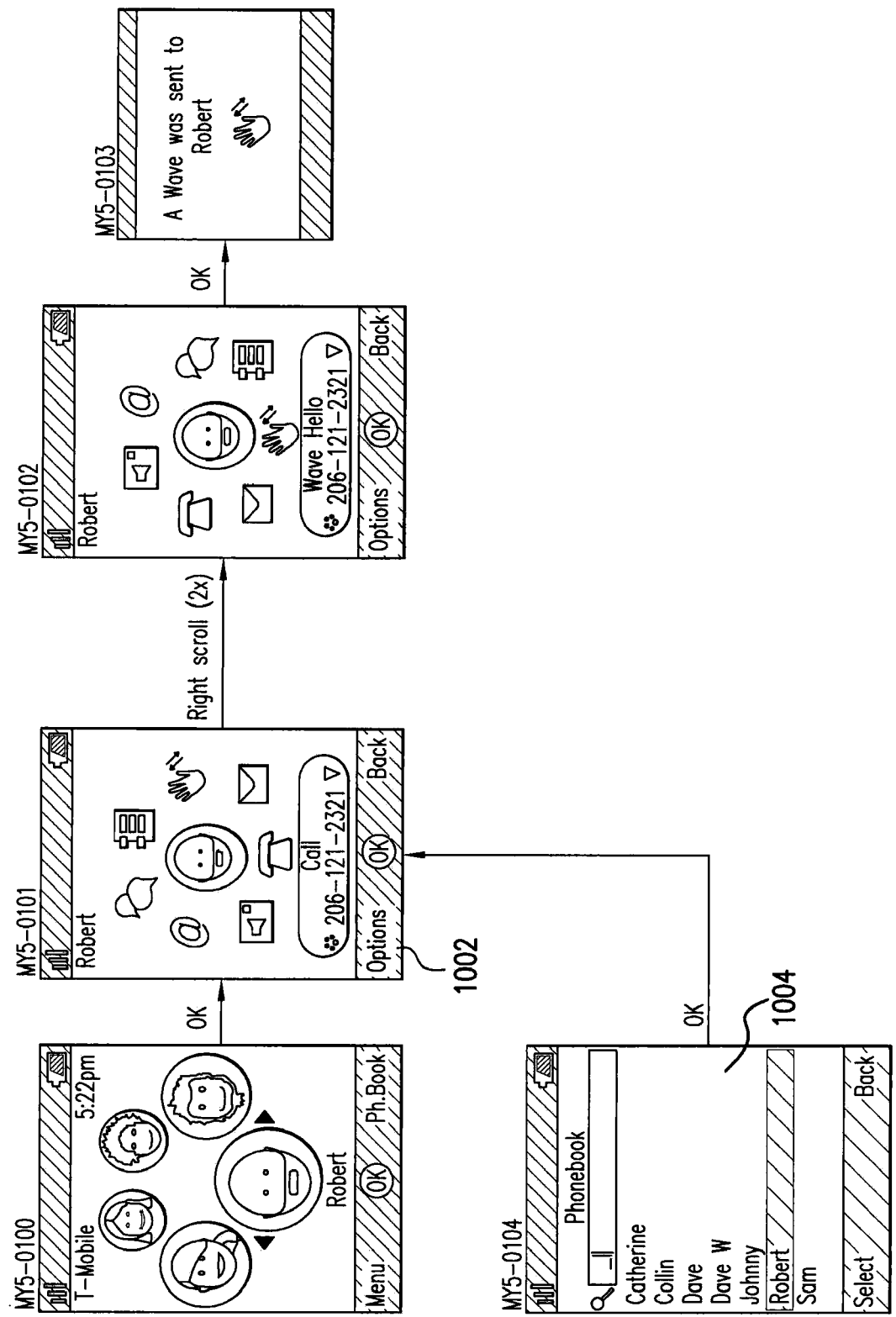
FIG. 10 shows an example user interface interaction sequence with a contact according to an embodiment of the present invention.
Figure 13:
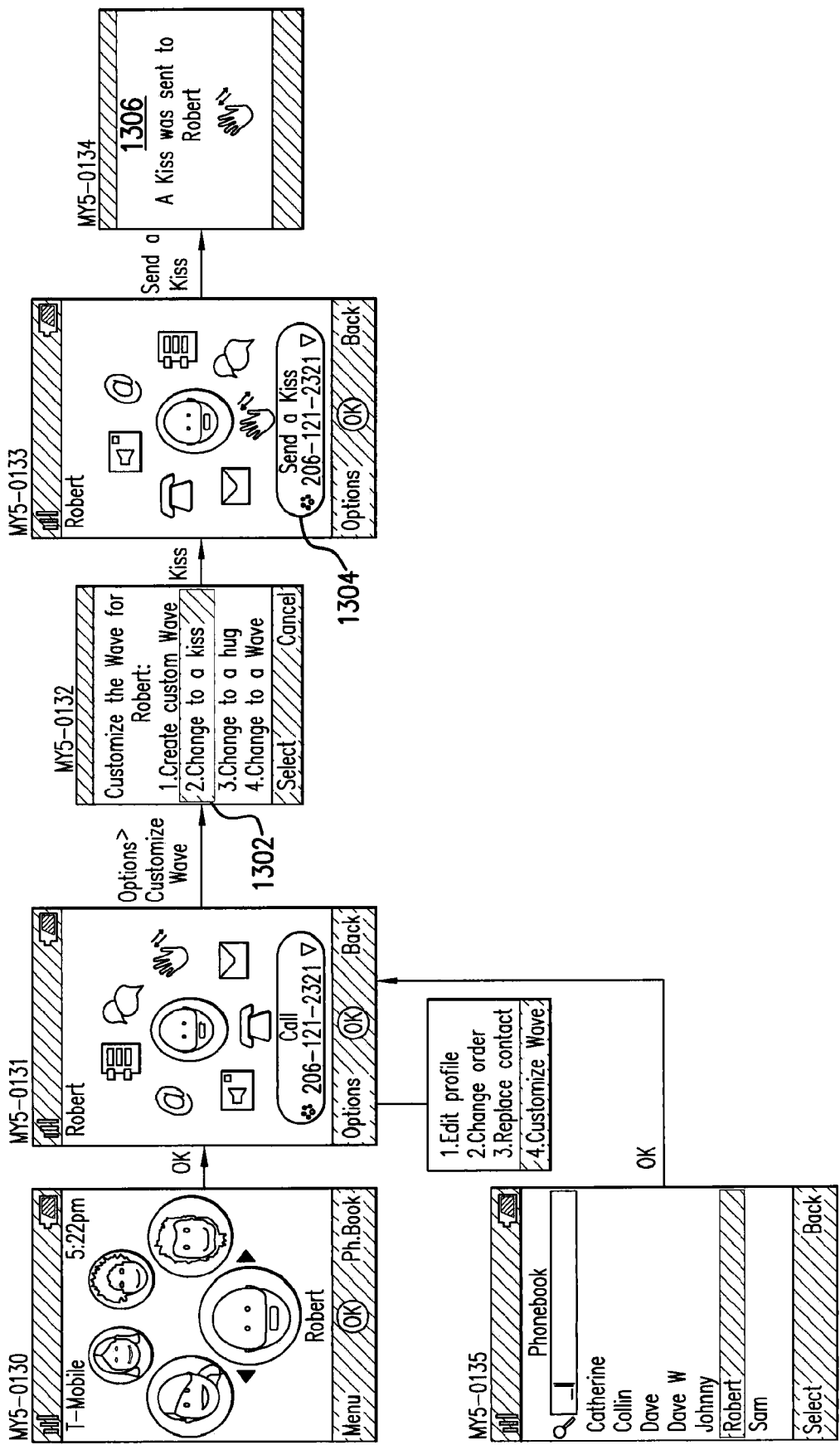
FIG. 13 shows an example user interface interaction sequence for customizing a contact according to an embodiment of the present invention.

FIGS. 1, 10, and 13 show an example interface (100) for customizing a convertible message. For purposes of this example, an MMS is used, however, as described above, any number of transmission methods and/or systems may be used. In customizing an exemplary message, a convertible function is provided for a specific contact. In an embodiment, the convertible messaging function enables a construction and customization of a contact specific wave message 802. A screen shot of an example options manual 102 is shown. The user may select to send a convertible message by selecting the customize wave function. After selecting the options screen, a number of customizations 104 are possible. A customization can be selected by traversing through the list of available customizations for the Wave message and pressing the "select key", or by pressing the corresponding number on the keypad. The illustrated customizations for the convertible message include create a custom wave ("1. Create custom wave"), change to a kiss ("2. Change to a kiss"), change to a hug ("3. Change to a hug"), change to a wave ("4. Change to a wave") 104. In an embodiment, a convertible messaging function composes an MMS with text, for each customizable wave option. For example, for a change to a wave, the corresponding text is "I'm waving hello"; for Change to a kiss, the corresponding text is "I'm sending a kiss"; for Change to a Hug, the corresponding text is "I'm sending a hug"; and for Create custom wave: MMS text is "<user custom message>". These example set texts associated with set icon may be any number of texts/icons set. In an embodiment, certain convertible messaging options may be predefined as available for only certain contacts. In an embodiment, a user may access their contact list or phonebook 1004 to search for the group of eligible users capable of receiving certain convertible messages. In an embodiment, the convertible messaging function may be made available to only to myFaves® users.

Selecting different messaging options for the convertible message enables the function to remember user selections for a specific contact. For example, the default message for Robert, a myFave® contact, may be "Wave Hello". If the user selects "Send a kiss" 1302 as the message associated with Robert, then "Send a kiss" replaces "Wave Hello" until otherwise changed by the user 1304. If the user chose hug, the predefined text in this example would recite "Send a hug". In an embodiment, the text may be displayed 1306 contextually based on message type sent, e.g.: "A wave was sent", "A custom wave was sent", "A kiss was sent", "A hug was sent".

In an embodiment, the convertible messaging function allows a user to select from predefined text strings or customize their own text for a convertible message associated with a specific contact. If the user does not select anything before sending a convertible message text, a default text string will be selected. If the user changes the convertible message text, the convertible message or "hello" function remembers the selected text message that corresponds to the affiliated contact within the contact group. For example, the convertible messaging function displays a label on the Communications screen to indicate the "Wave" text selection when the "Send Wave" option is highlighted 106. For example, if Wave is selected, the label may be: "Wave Hello"; if Kiss is selected, the label may be: "Send a Kiss"; if Hug is selected, the label may be: "Send a Hug"; if Custom wave is selected, the label may be whatever the user inputs as text. For example, in selected Custom wave, a popup screen or other user interface may allow for a user to input the text to be used. In an example embodiment, FIG. 9 provides an overview of various user screens which may change as various messages are changed and sent to the recipient.

Figure 2:
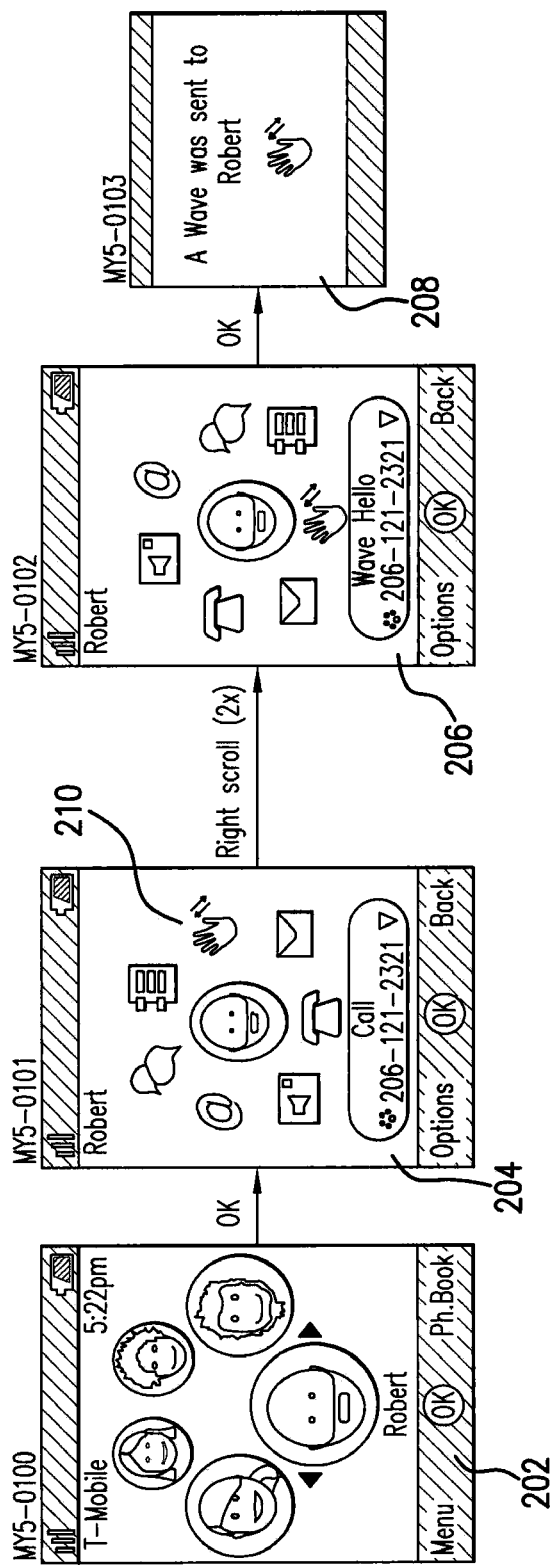
FIG. 2 shows an example transmission of a convertible message from the communications screen according to an embodiment of the present invention.

FIG. 2 illustrates sending a Wave message from the communications screen. Screen shot 202 displays a user interface for selection of a contact from a group of contacts. In example screenshot 202, the dimensions of the graphical icon (a photo in this case) are larger for the selected contact than the other non-selected contacts. Text identifying the selected contact's name is included around the bottom line of the graphical display. A user may select further menu options associated with any particular user on the circular contact group. In the present embodiment, an "OK" selection 202 for Robert results in generation of additional functions on the communication screen. A user may perform a plurality of tasks associated with Robert's profile. One such function is the Wave Hello function 210, which allows users to send a wave via the communications screen 204. In the present embodiment, the user scrolls toward the convertible messaging function 210, the communication screen displays the default message, or alternatively, the previously selected Wave MMS text message, for example, is now displayed for sending current text message 206. Next, the user may select to send the message as is 208 or make additional customizations through steps 102 through 106. The convertible messaging function operates to compose and send a Wave MMS, for example, in the background when a user selects to send a wave. For example, during the construction of the convertible message, the convertible messaging function uses a default waiving hand icon, which may be provided by the service provider as a Wave micro icon display. The convertible messaging function affiliates the message with the wave micro icon display. In an embodiment, the micro icon may be pre-stored on the device itself, or downloaded from the service provider. The waiving hand icon or a Wave micro icon display can be GIF87a or GIF89a format when composing the Wave MMS and file size, for example, may be limited to a set size, e.g., about 20 kilobytes.

Figure 6:
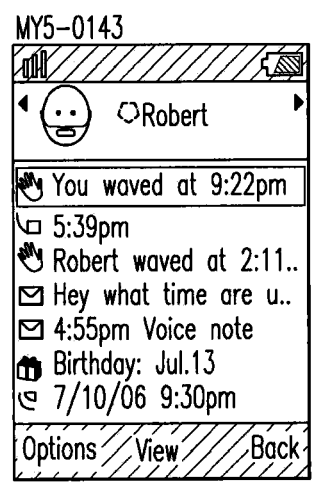
FIG. 6 shows an example time stamp in an activity log according to an embodiment of the present invention.

In an embodiment, the convertible messaging function displays a confirmation to the user when a convertible message has been sent 208. The convertible messaging function stores the outgoing Wave MMS, for example, in the sent box during the sending process. An indicator may be displayed in the sent box to show that send is in progress. In an embodiment, once a convertible message has successfully been sent, the convertible messaging function removes it from the Sent box. That is, sent convertible messages are not stored in the Sent box. In an embodiment, if a convertible message failed to send, the device retains this message in the Sent box with a visual indicator showing that send failed. The device may allow users to retry sending failed convertible messages from the Sent box. In an embodiment, during this mode, the device does not allow users to edit the convertible message in the Sent box, however, the device can allow a user to delete failed convertible messages in the Sent box. In an embodiment, a timestamp of a sent convertible message is recorded in the activities log (FIG. 6).

Each of the above-described idle screens permits the user to change the message associated with currently-selected contact by traversing the group of contacts in the user's contact group via the various navigation buttons/interfaces on the communication device (e.g., a wireless communication device, a PDA or PIN style device, etc.). A variety of graphical effects can be applied to the display screen when the user traverses the group of contacts appearing in the interface, such as an animated rotation effect, a picture swap effect, a fade-in effect, a fade-out effect, a fly-in effect, a fly-out effect, a dissolve-in effect, a dissolve-out effect, a spiral-in effect, a spiral-out effect, a slide-in effect, and a slide-out effect.

The preferred contact group centric interface that is described herein is described in terms of navigation/selection buttons and keys on a mobile device, as well as other specially designated selectors that are used for initiating and canceling, e.g., telephone calls. However, any appropriate navigation/selection means is contemplated within the scope of this discussion including, but not limited to a keypad, a directional key, a dynamically assigned soft key, a joypad-style interface, a joystick-style interface, a trackball-style interface, a touch screen type interface, and a stylus type interface. Other means of navigation/selection can include side key push and hold, speech recognition, and motion recognition.

Figure 3:
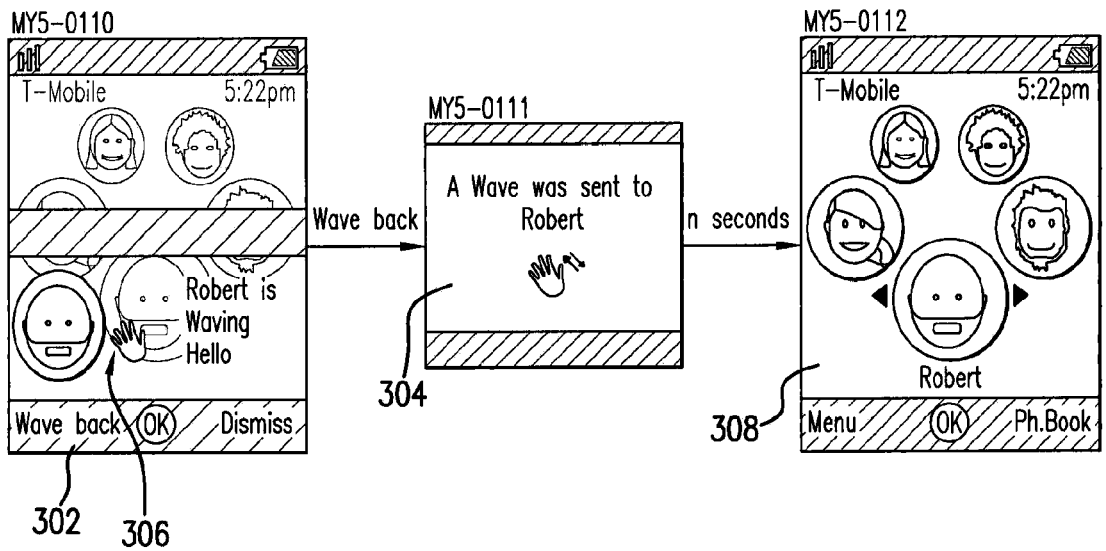
FIG. 3 shows a diagram of a convertible response message according to an embodiment of the present invention.
Figure 5:
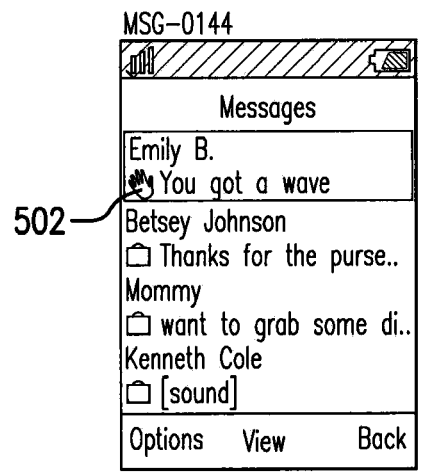
FIG. 5 shows an example convertible MMS message according to an embodiment of the present invention.

FIG. 3 is an illustration of a Waving back or response to the example Wave MMS sender. For example, the convertible messaging function on the recipient displays a special notification on the idle screen when a new "hello" or convertible message is received 308. In an embodiment, the same notification may be used regardless of whether or not the sender is one of receiver's contacts. Alternatively, different notifications may be used. In an embodiment, the convertible messaging function determines whether the sender is a member of the recipient's contact list. Here, as shown, if the sender is within the receiver's contact list, the sender's contact photo is displayed along with an animated micro icon 306 and the message created by the sender. The recipient may select to dismiss the message or wave back on the bottom of the communication screen. Should the user select to wave back, a corresponding convertible message is sent from the original recipient to the original sender. In an embodiment, the convertible messaging function keeps detailed records based upon the received convertible message(s). FIG. 5 shows that all received convertible messages may be stored in the message Inbox. Received convertible messages from the contacts list may be captured in the activities log as well in order to record a time stamp for when the convertible message is received.

Figure 4:
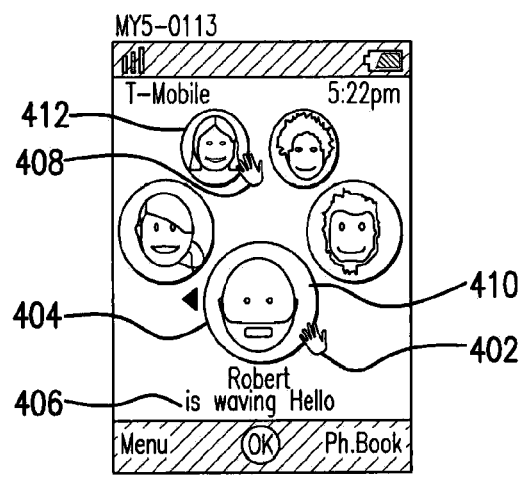
FIG. 4 shows an example convertible icon display according to an embodiment of the present invention.

FIG. 4 illustrates an example Wave micro icon display. In an embodiment, when a new convertible message is received and the sender of the message is on the recipient's myFave® contact list, the convertible messaging function displays a micro icon. In an embodiment, the icon is an animation such as a waving hand 402 below the contact's photo or image icon 404 on the idle screen. In an embodiment, this is applicable if the sender's contact icon is not hidden. During the receiving process, when the contact icon 404 is in the center circle position 410, the embedded text of the received convertible message, which may be limited to a predefined character length or memory size, is displayed below the contact's icon and name 406. In another embodiment, when an incoming convertible message arrives while the contact icon is away from the center circle position 412, the client screen displays an animated waving hand icon below that particular contact's contact icon 408. As shown, the animated icon 408 adjacent to a remotely located myFave® contact icon 412 away from the center circle position (410) waves a predetermined amount of time to notify the recipient. The animation automatically stops when the contact icon is moved into circle position 410. In an embodiment, the convertible messaging function removes the waving hand micro icon and the message text from the idle screen permanently if the user enters the communication screen for the contact that sent the wave 700. The convertible messaging function removes the waving hand micro icon and the message text from the idle screen permanently if the user selects to "Wave back," for example, from the new message notification pop up 302, 306, 304, and 308.

Figure 7:
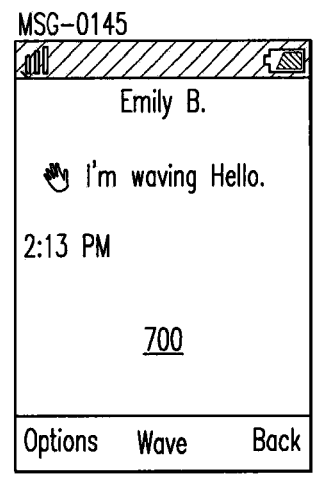
FIG. 7 shows an example user interface with subject line, icon, and text according to an embodiment of the present invention.
Figure 8:
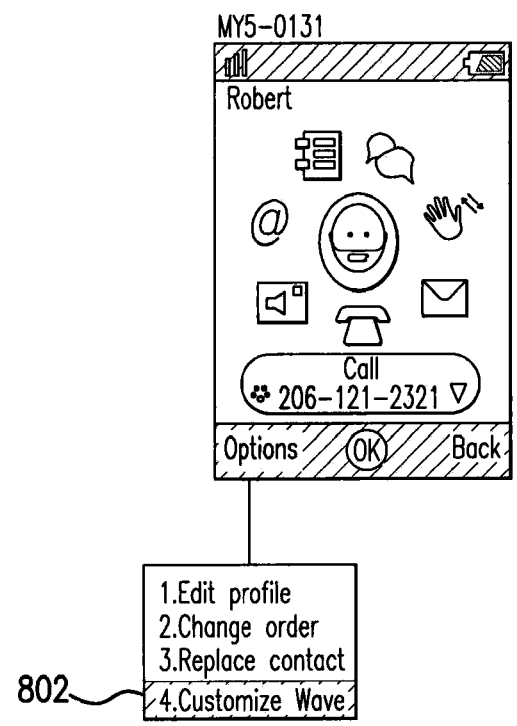
FIG. 8 shows an example customization of convertible messaging according to an embodiment of the present invention.
Figure 16:
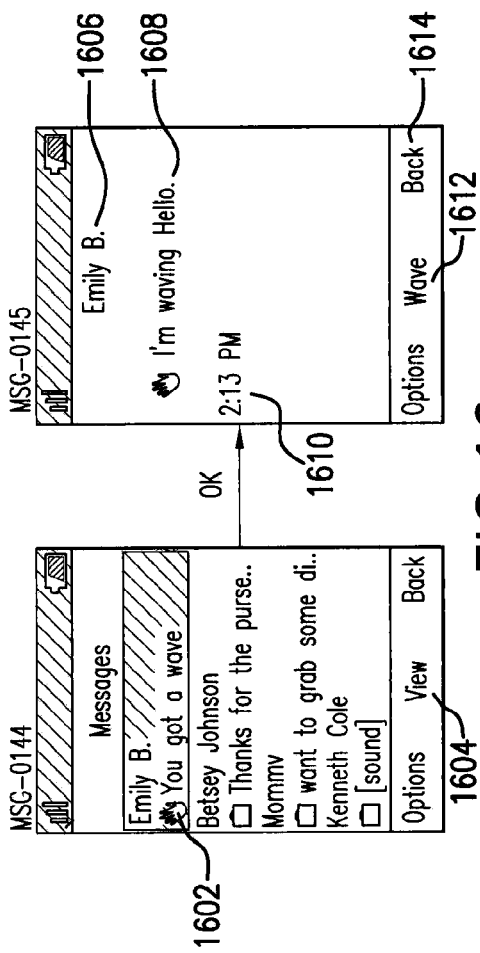
FIG. 16 shows an example user interface interaction sequence for storing contact messages and an associated message inbox according to an embodiment of the present invention.

FIG. 5 illustrates an exemplary Message Inbox for a user device. In an embodiment, the convertible messaging function stores received convertible message, or, as shown here, a Wave MMS, in the device Inbox. An icon 502 is provided by service provider to indicate the message is a convertible message. FIG. 16 depicts an exemplary interface for a Message Inbox. The received convertible messages are stored in the messaging inbox 1600 and are identified by Wave icons 1602. To save storage space on the user device, sent "hellos," "Waves," and/or other convertible message(s) may be set to be not recorded in the outbox after they are successfully sent. The user may select to view a specific convertible message in the Inbox 1604. Referring to FIGS. 7 and 16, the convertible messaging function generates another interface in response to "viewing" input. This interface includes displaying of sender's name 1606, the message 1608, and the time of the receipt of message 1610. If the sender is within the user's contact list, a response or "Wave back" option 1612 is available to the user, where a corresponding wave message may be constructed and reply to the sender (102, 104, and 106).

As may be desired in an interface, the "Back" key feature 1614 can permit the user to dismiss the communication options menu and return to a prior screen such as the idle display screen. Similar to that discussed previously, the preferred contact group centric interface automatically retrieves addressing information for any of the selected communication modes such that activation of a communication mode only requires a single click.

Although the above-described example communication options menu is arranged in a circular or elliptical arrangement that rotates about a central axis on the screen, other arrangements are also available such as a linear list, a vertical list, a horizontal list, a diagonal list, a circular shape, a semicircular shape, an elliptical shape, a triangular shape, a diamond shape, a U-shape, an L-shape, a square shape, a quadrilateral shape, a pentagonal shape, a hexagonal shape, another geometric patterned shape, a two-dimensional pattern, and a three-dimensional pattern. While the above description of the communication options menu is described with a rotation about a central axis, graphical effects can also be used such as an animation effect, a highlight effect, a fade-in effect, a fade-out effect, a fly-in effect, a fly-out effect, a dissolve-in effect, a dissolveout effect, a spiral-in effect, a spiral-out effect, a slide-in effect, and a slide-out effect.

The above-described example is illustrated having a bottom center location of the display screen which corresponds to the currently selected communication mode. In embodiments, any other screen location may also be utilized for the currently selected communication mode. Moreover, the graphical icons can remain stationary in another example, where a graphical indicator of the currently selected communication mode moves about the screen. The graphical indicator can be any desired effect such as a highlight effect, a selection box, an inverse video effect, etc.

Figure 15:
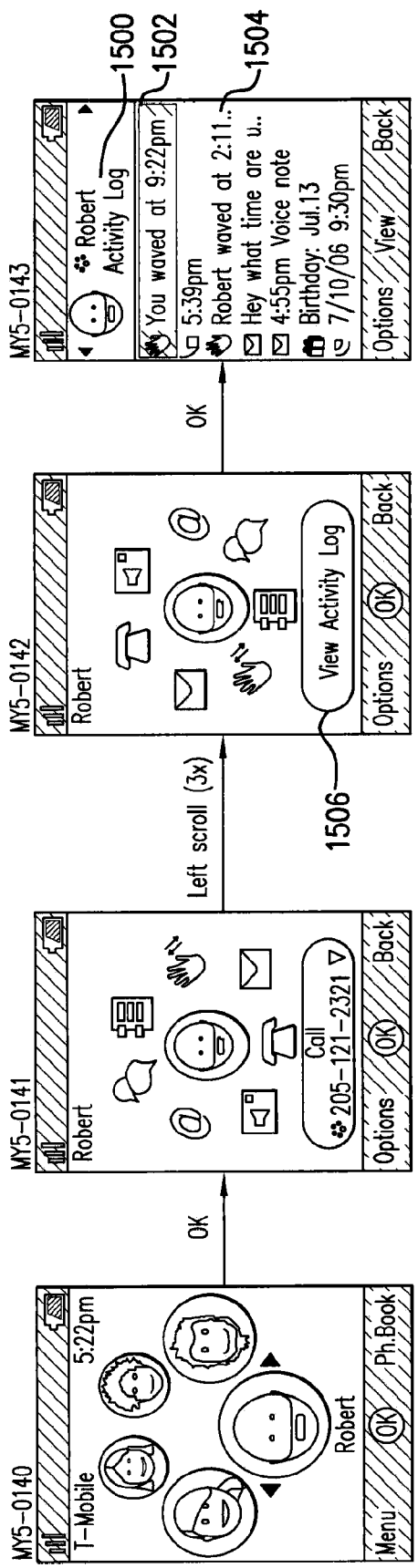
FIG. 15 shows an example user interface interaction sequence for storing contact messages and an associated activity log according to an embodiment of the present invention.

FIGS. 6 and 15 show an example interface interaction sequence for storing convertible messages associated with an Activity Log 1500. Selecting "Activity Log" from the communication options menu activates a communications activity log interface that is associated with the selected contact. Communication activities for the selected contact are then displayed on the screen. The Activity Log 1500 can include any number of activities such as, for example, time and date of calls, text messages, voice notes, pictures received. The Activity Log interface is illustrated with a "Back" key feature that permits returning to a prior screen such as the communication options menu. Additional options can also be available from the Activity Log interface such as "clear history", as well as others. In an embodiment, the convertible messaging function record a time stamp of each Wave message that is received 1504 and sent 1502 in the Activity Log associated with each contact. In an embodiment, when multiple convertible messages are received from the same sender, and the sender is within the contact list of the recipient, the convertible messaging function displays the latest message text when the sender's contact icon is in the center circle position on the idle screen 406.

Figure 11:
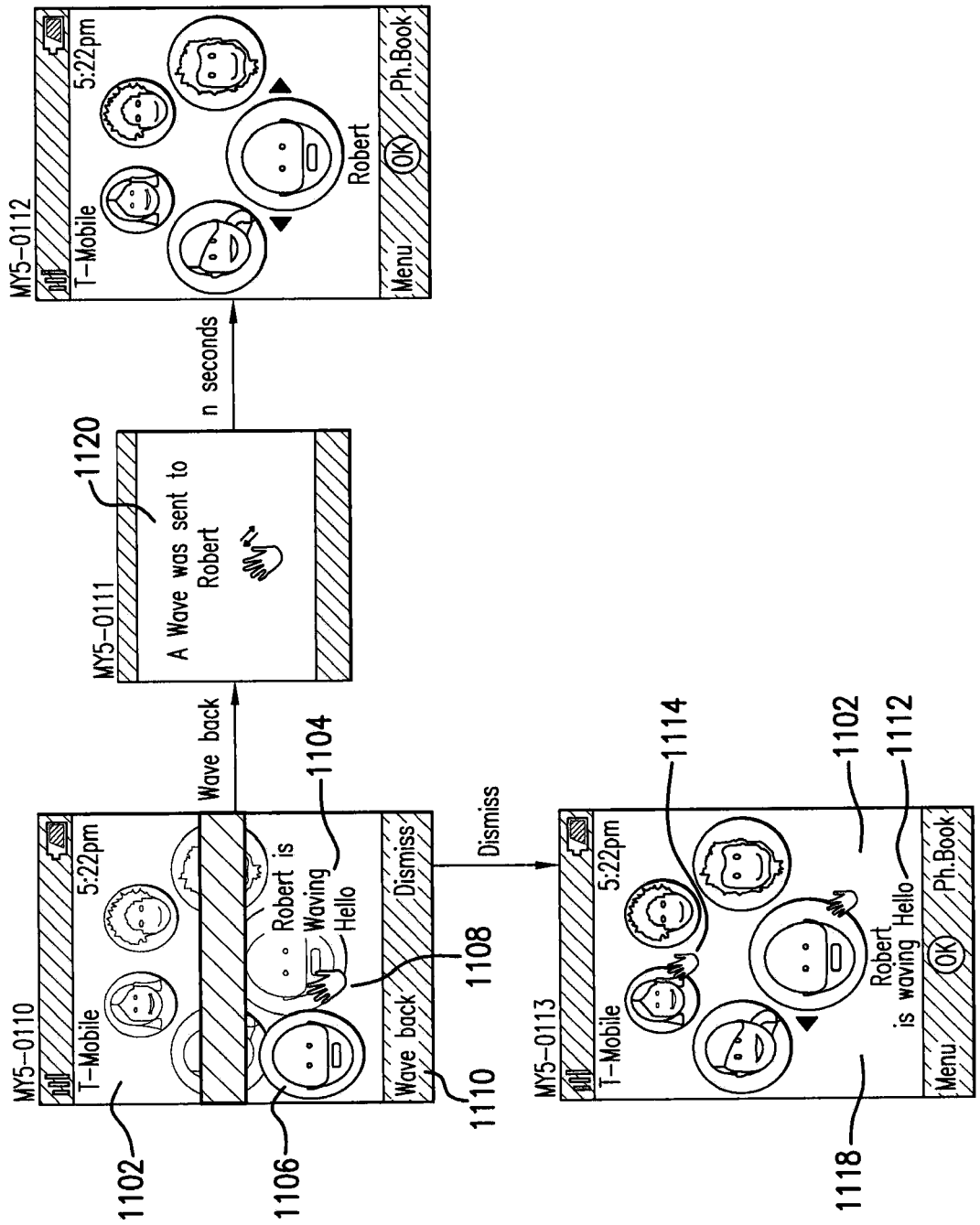
FIG. 11 shows an example user interface interaction sequence for receiving contact according to an embodiment of the present invention.
Figure 12:
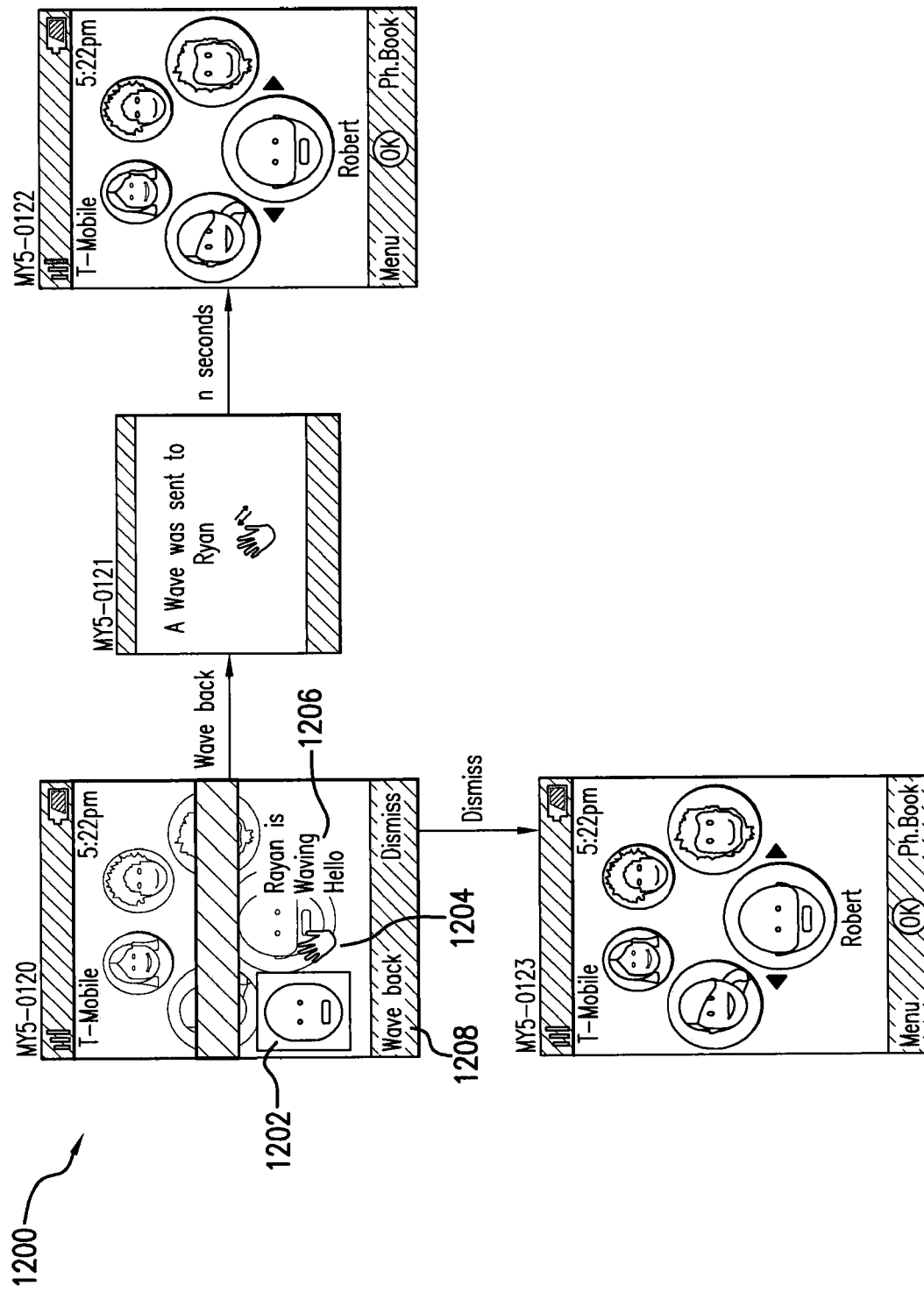
FIG. 12 shows an example user interface interaction sequence for receiving contact from a source not known to the receiver's address book according to an embodiment of the present invention.
Figure 14:
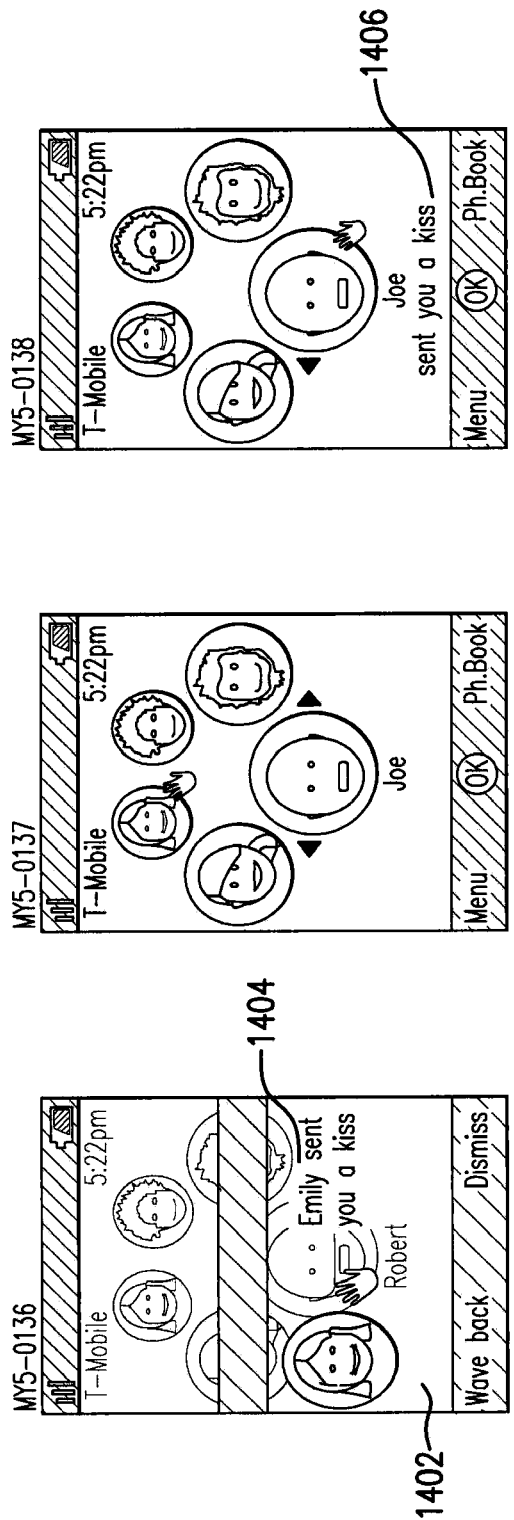
FIG. 14 shows an example user interface interaction sequence for receiving a convertible message according to an embodiment of the present invention.

FIGS. 11, 12, and 14 show example embodiments of the present invention for a user receiving a convertible message. In an embodiment, when the device receives, e.g., an MMS message, it will download the message 1102 before displaying a notification pop-up on the idle screen. The convertible messaging function determines whether the incoming MMS message is a convertible message, in accordance with the present embodiment, this can be done by parsing the message for the "hello" or convertible message icon, body of the message itself, and/or predefined special subject line of the MMS, field line of an email, port of an SMS, etc. For example, an MMS message is considered by the recipient if the message subject is "Wave Hello" 1104 (as shown for example purposes here in this embodiment). In an embodiment, when the device's audio profile is set to normal, the convertible messaging function instantiates corresponding functions on the user device to play an audio alert and vibrate when a new convertible message or "hello" is received. The type of audio alert theme and the degree of vibration may be selected by the user. During the receiving process, the convertible messaging function further determines whether the sender is a part of the recipient's myFave® contact list. If the sender is a part of the myFave® contact list, the convertible messaging function may be configured to retrieve the myFave® sender's photo or image icon 1106, and/or animate a micro icon that is associated with the incoming message 1108, and/or display the incoming message 1104. In an embodiment, the recipient has the option of waving back at the sender in the present embodiment. In an embodiment, the animation of the micro icon lasts for a predetermined amount of time. In an embodiment, a non-myFave® can also send the recipient convertible messages, however there are less features affiliated with that configuration. For example, a sender's photo or image icon 1202, if available, is retrieved from the device. The animating micro icon 1204 and the incoming convertible message 1206 are displayed on the communication screen 1200. In an embodiment, the response of "Wave back" feature 1110 is disabled for non-myFave® users. In accordance with this aspect of the embodiment, "Reply" using a regular message composer (not shown) replaces the Wave back feature 1110 when the waved is received from a non-myFaves® contact.

In an embodiment, when the device receives a convertible message, the communication screen displays a special notification pop up in the idle screen 1402. If the sender of the convertible message has an affiliated entry in the device phonebook, the convertible messaging function displays the affiliated name in the new message notification popup on the idle screen 1404. Alternatively, if the sender of the convertible message does not have an affiliated name in device phonebook, the convertible messaging function will display the sender's Mobile Subscriber Integrated Services Digital Network Number (MSISDN) in the new message notification pop up on the idle screen. In an embodiment, the convertible messaging function displays up to 15 characters of the text that is embedded in the convertible message in the new message notification on the idle screen 1112. During the display process, a non-centered myFave® contact may also receive a convertible message. The corresponding Wave micro icon animation is generated and displayed on the communication screen 1114.

In accordance with an embodiment of the present application, the convertible messaging function supports a dismiss softkey 1116 on the notification pop up for a new convertible message. The dismiss softkey dismiss the notification when selected 1116 and results in another screen either replaces the current screen or overlays the current screen with the home screen 1118. For example, the waving hand micro icon 1114 may still be displayed even after the user has dismissed the notification pop up 1100. In an embodiment, the convertible messaging function, upon receiving the convertible message support a "Wave back" or response softkey 1110 in the notification pop up 1100 on the idle screen if the sender of the convertible message is one of the user's myFave® group. In an embodiment, when selected, the "Wave back" or response softkey composes and sends a convertible message to the earlier sender. The convertible messaging function displays a confirmation to user 1120 after a convertible message has been sent via the "Wave back" or response softkey in the idle screen. The confirmation indicates what kind of message was sent. (e.g., custom wave, kiss, hug, other). Alternatively, the convertible messaging function also supports a "Reply" softkey in the notification pop up on the idle screen if the sender of the convertible message is not one of user's Faves or on the receiver's contact list or identified as not needing a convertible message sent back. The user can press the "Reply" key (e.g., the left button on the joypad, an "OK" button, or some other button). In an embodiment, when selected, the "Reply" softkey takes the user to the intuitive composer screen. If intuitive composer is not supported, "Reply" takes the user to the SMS or email or MMS or other composer in order to respond to the convertible message.

The subject matter defined in the appended claims is not necessarily limited to the specific features, or specific implementations described above. Many other configurations of computing devices, communications features, applications, and distributed software and/or hardware systems may be employed to implement the described invention. The specific features and methods described above are thus disclosed as example forms of implementing the claims and embodiments. Further, the example embodiments described herein may be used in combination with and without each other.

What is claimed is:

1. A method for transmitting a convertible message to a receiving device, comprising:
   selecting at least one contact having an address;
   selecting the convertible message to transmit to a receiving device;
   transmitting the convertible message to the receiving device,
   wherein the selecting the at least one contact initiates population of an address field of a specific transmission method, and wherein the selecting the convertible message initiates a population of:
   a) a message content, and
   b) a trigger field in the convertible message with a conversion trigger by reading a subject line of the specific transmission method, wherein the subject line contents indicate the convertible message.

2. The method of claim 1, wherein the conversion trigger is a character text string.

3. The method of claim 1, wherein the selecting the convertible message includes:
   selecting the specific transmission message method; and
   selecting the message content.

4. The method of claim 3, wherein the message content is one of: a pre-defined message and a customized message.

5. The method of claim 4, wherein the pre-defined message is one of: a pre-selected message associated with a specific contact and a message selectable from a provided list of defined messages.

6. The method of claim 3, wherein the message content applies to all contacts of the at least one contact, or to a specific contact of the at least one contact.

7. The method of claim 3, wherein the message content is at least one of: text, an icon, an animated icon, an animation, an image, an animated image, audio, and a video.

8. The method of claim 3, wherein the specific transmission method is one of: a Short Message Service (SMS), a Multimedia Messaging Service (MMS), an Instant Message (IM), an electronic mail (E-mail), a transmission via Simple Mail Transfer Protocol (SMTP), a transmission via Post Office Protocol (POP), a transmission via Internet Message Access Protocol (IMAP), a transmission via IP Multimedia Subsystem running over Standard Internet Protocols (IMS-SIP), a transmission via User Diagram Protocol (UDP), and a transmission via Internet Protocol (IP).

9. The method of claim 1, wherein the address is one of: an email address, International Mobile Subscriber Identity (IMSI) address, an Internet Message Format (IMF), a Medium Access Control (MAC) address, a telephone number, a network address, and a device identification number.

10. The method of claim 1, wherein the at least one contact is associated with a stored contact file in an address book of the transmitting device.

11. The method of claim 1, wherein the receiving device is at least one of telecommunications-capable and IP protocol-capable.

12. The method of claim 1, wherein the transmitting device transmits the convertible message to the receiving device, the transmitting device being at least one of telecommunications-capable and IP protocol-capable.

13. The method of claim 1, wherein the specific transmission method is one of any available messaging means having at least two fields, the trigger field and at least one field to include the message content, wherein the trigger field includes the conversion trigger to initiate action appropriate for the convertible message.

14. The method of claim 1, wherein the specific transmission method is an MMS and the conversion trigger is a trigger convertible message header.

15. The method of claim 1, wherein different convertible messaging events are preset for each contact or a specified group of contacts.

16. The method of claim 1, wherein a convertible messaging event can be customized with an automatic message, such that a first message can be sent during a first specified time period, and a second message can be sent during a second specified time period automatically depending on the time of day the convertible message is sent.

17. The method of claim 1, wherein the receiving device either (i) manually accepts, or (ii) automatically accepts to view the convertible message upon receipt.

18. A method for receiving a convertible message, comprising:
receiving a convertible message by a receiving device via a communications path;
identifying by the receiving device a conversion trigger in a trigger field in the received convertible message having a message content;
associating the conversion trigger with at least one conversion rule in a database to provide a converted convertible message; and
displaying the converted convertible message on the receiving device.

19. The method of claim 18, wherein the database resides on at least one of: the receiving device, a server, and a network.

20. The method of claim 18, wherein the displaying of the converted convertible message is a playing of an audio file.

21. The method of claim 18, wherein the conversion trigger is a character text string.

22. The method of claim 18, wherein the converted convertible message includes at least one of: a text, an icon, an animated icon, an animation, an image, an animated image, audio, and a video.

23. The method of claim 18, wherein the convertible message is one of: a Short Message Service (SMS), a Multimedia Messaging Service (MMS), an Instant Message (IM), an electronic mail (E-mail), a transmission via Simple Mail Transfer Protocol (SMTP), a transmission via Post Office Protocol (POP), a transmission via Internet Message Access Protocol (IMAP), a transmission via IP Multimedia Subsystem running over Standard Internet Protocols (IMS-SIP), a transmission via User Diagram Protocol (UDP), and a transmission via Internet Protocol (IP).

24. The method of claim 18, wherein the converted convertible message includes at least one of: an animated waving hand, an animated waving hand with an audio sound, a kiss icon, a kiss icon with an audio sound, a hug icon, a hug icon with an audio sound, an animated hug icon, and an animated hug icon with an audio sound.

25. A system for sending and receiving a convertible message, comprising:
a convertible message having an address, a conversion trigger, and a message content, the convertible message prepared by a transmitting device, wherein the convertible message uses a messaging service;
a conversion rule stored in a database, the conversion rule being associated with the conversion trigger by reading a subject line of the messaging service, the subject line contents indicating the convertible message; and
a converted convertible message,
wherein when the convertible message is transmitted from a transmitting device to a receiving device, the receiving device converts the convertible message into a converted convertible message based on the associated conversion rule and displays the converted convertible message including the message content.

26. The system of claim 25, wherein the convertible message is one of: a Short Message Service (SMS), a Multimedia Messaging Service (MMS), an Instant Message (IM), an electronic mail (E-mail), a transmission via Simple Mail Transfer Protocol (SMTP), a transmission via Post Office Protocol (POP), a transmission via Internet Message Access Protocol (IMAP), a transmission via IP Multimedia Subsystem running over Standard Internet Protocols (IMS-SIP), a transmission via User Diagram Protocol (UDP), and a transmission via Internet Protocol (IP).

27. The system of claim 25, wherein the conversion trigger is a character text string.

28. The system of claim 25, wherein the converted convertible message includes at least one of: a text, an icon, an animated icon, an animation, an image, an animated image, audio, and a video.

29. The system of claim 25, wherein the converted convertible message includes at least one of: an animated waving hand, an animated waving hand with an audio sound, a kiss icon, a kiss icon with an audio sound, a hug icon, a hug icon with an audio sound, an animated hug icon, and an animated hug icon with an audio sound.

30. The system of claim 25, wherein each of the receiving device and the transmitting device is at least one of telecommunications-capable and IP protocol-capable.

31. A method for transmitting a convertible message to a receiving device, comprising:

selecting at least one contact having an address;

selecting the convertible message to transmit to a receiving device, wherein the convertible message uses IP Multimedia Subsystem running over Standard Internet Protocols (IMS-SIP) to establish a session between at least two entities;

transmitting the convertible message to the receiving device by sending pings between a receiving device, a network, and a sending device regarding availability before the convertible message is transmitted, wherein the selecting the at least one contact initiates population of an address field of the IMS-SIP, and wherein the selecting the convertible message initiates a population of:

a) a message content, and b) a trigger field in the convertible message with a conversion trigger.

32. A method for transmitting a convertible message to a receiving device, comprising:

selecting at least one contact having an address;

selecting the convertible message to transmit to a receiving device, wherein the convertible message uses Short Message Service (SMS) having at least a first port and a second port;

transmitting the convertible message to the receiving device, wherein the selecting the at least one contact initiates population of an address field of the SMS, and wherein the selecting the convertible message initiates a population of:

a) a message content, and b) a trigger field in the convertible message with a conversion trigger in which the first port contains a convertible message header container and the second port contains the content such that the content indicates how to direct and display the convertible message on the receiving device.

\* \* \* \* \*